United States Patent [19]

Booker

[11] Patent Number: 4,746,043
[45] Date of Patent: May 24, 1988

[54] ENCLOSURE FOR DEVICES SUCH AS CALCULATORS

[76] Inventor: David R. Booker, 4130 Westland Cir., Anchorage, Ak. 99517

[21] Appl. No.: 893,162

[22] Filed: Aug. 5, 1986

[51] Int. Cl.$^4$ .............................................. A45F 3/14
[52] U.S. Cl. .................... 224/219; 150/52 R; 224/151; 224/901; 224/907
[58] Field of Search .............. 224/219, 267, 907, 901, 224/224, 222, 221, 151; 206/305; 150/52 J, 52 R; 248/346, 351

[56] References Cited

U.S. PATENT DOCUMENTS

| | | |
|---|---|---|
| 546,208 | 9/1895 | West . |
| 1,453,671 | 5/1923 | Harrold ............................ 224/267 X |
| 2,219,974 | 10/1940 | Bellow ............................. 248/346 X |
| 2,421,253 | 5/1947 | Fleischner ........................... 224/151 |
| 3,547,324 | 12/1970 | Parks .................................. 224/221 |
| 4,044,980 | 8/1977 | Cummins . |
| 4,053,047 | 10/1977 | Andeaggi ........................ 206/305 X |
| 4,071,065 | 1/1978 | Halbich . |
| 4,108,340 | 8/1978 | Conn . |
| 4,135,653 | 1/1979 | Sieloff ................................. 224/222 |
| 4,136,805 | 1/1979 | Storms . |
| 4,141,401 | 2/1979 | Hindemit . |
| 4,259,568 | 3/1981 | Dynesen . |
| 4,381,025 | 4/1983 | Schooley . |
| 4,415,106 | 11/1983 | Connell et al. ................. 224/267 X |
| 4,420,078 | 12/1983 | Belt et al. ........................ 150/52 RX |
| 4,432,477 | 2/1984 | Haidt et al. ......................... 224/222 |
| 4,444,520 | 4/1984 | Hanakata et al. . |
| 4,500,019 | 2/1985 | Curley, Jr. . |
| 4,606,524 | 8/1986 | Conee ................................. 248/346 |

FOREIGN PATENT DOCUMENTS 2518380 6/1983 France .

OTHER PUBLICATIONS

Lap Desk Stock #GG1 "Park Lane".

Primary Examiner—Henry J. Recla
Assistant Examiner—Robert M. Petrik
Attorney, Agent, or Firm—Hall, Myers & Rose

[57] ABSTRACT

An enclosure for a pocket calculator can be mounted on the user's forearm or mounted at a 45° angle to a desktop. This dual positioning of the calculator is achieved by a pad positioned between the enclosure and the user's forearm when the enclosure is mounted on the forearm. When it is desired to mount the calculator on a desktop, the pad may be partly folded to form a prop for propping the upper side of the calculator above the desktop. The enclosure has a transparent window above the keys of the calculator made of a plastic vinyl material so highly flexible that the user can depress any selected key with his finger without depressing any other key.

15 Claims, 2 Drawing Sheets

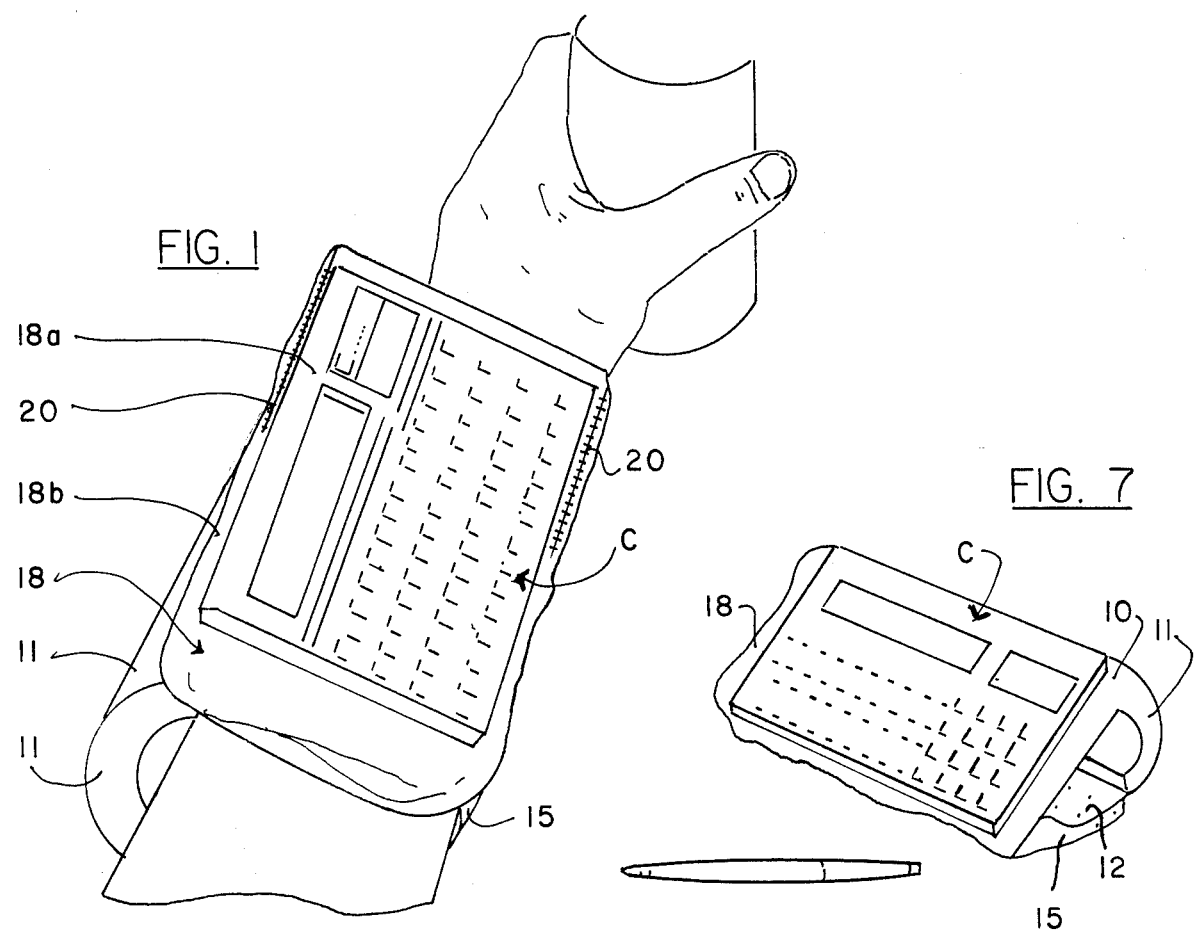
FIG. 1
FIG. 7
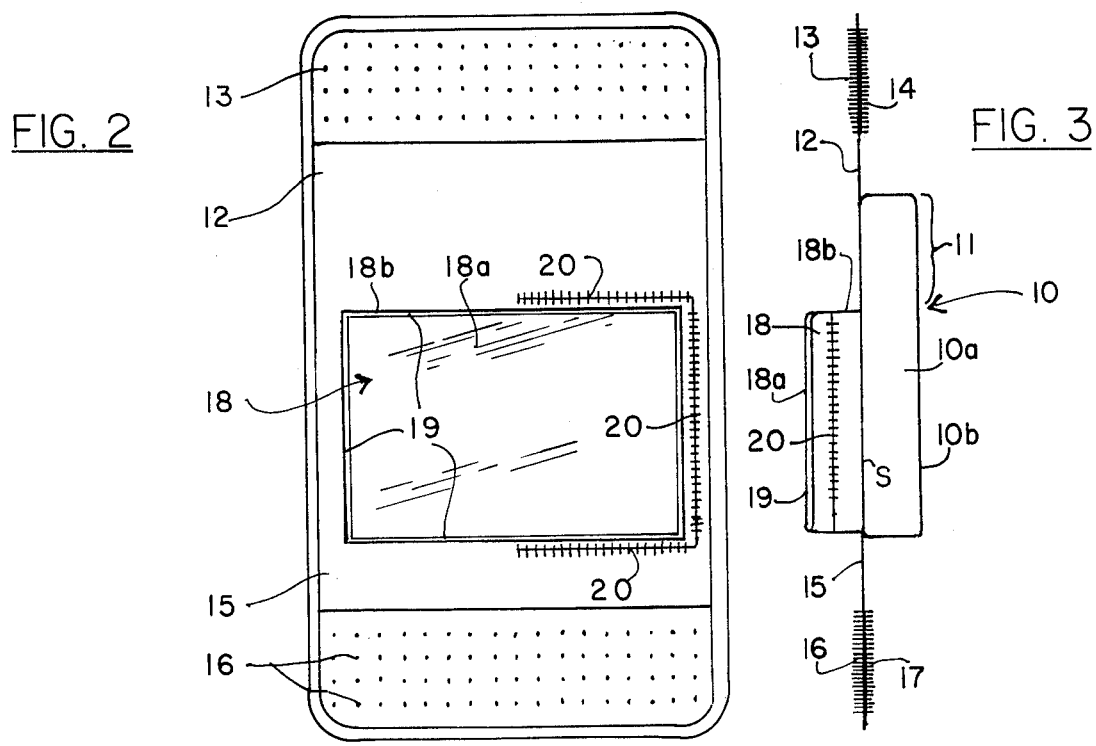
FIG. 2
FIG. 3

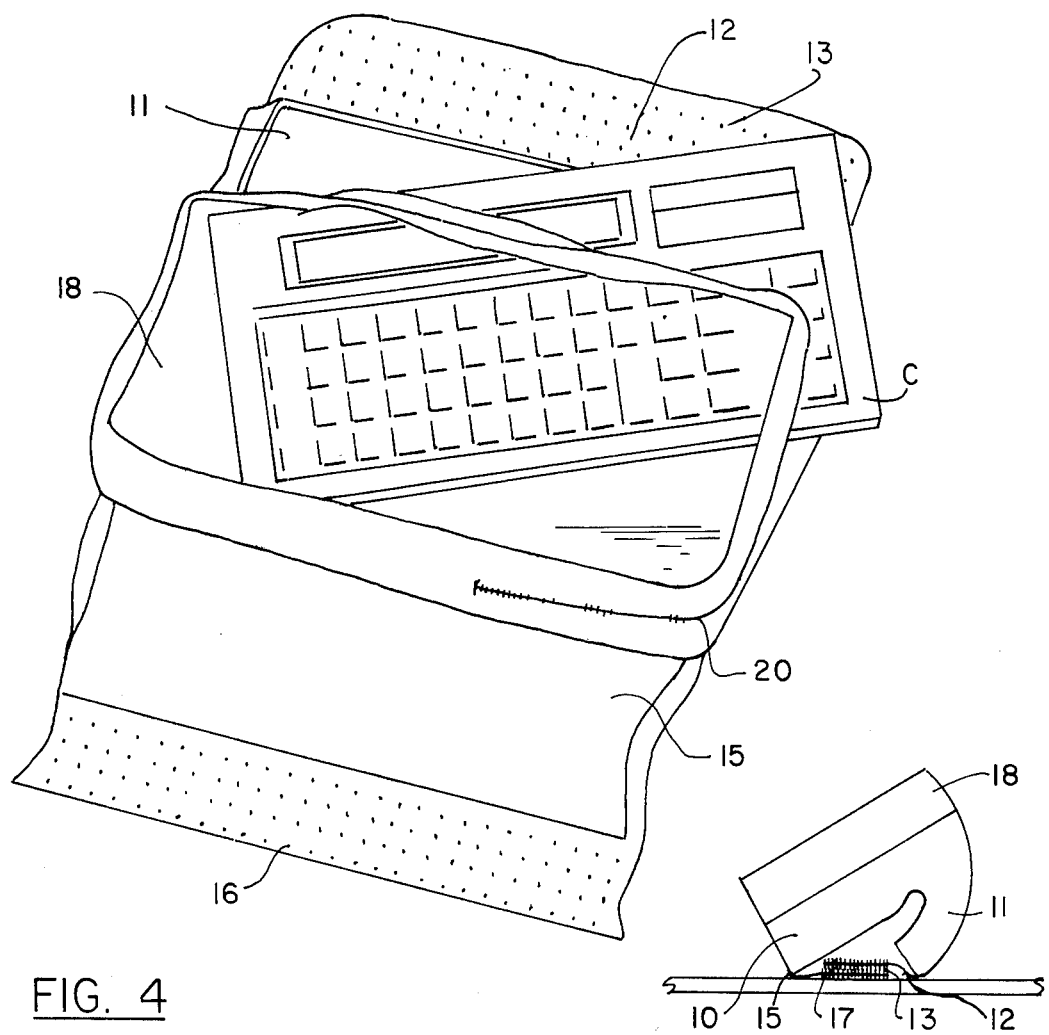
FIG. 4
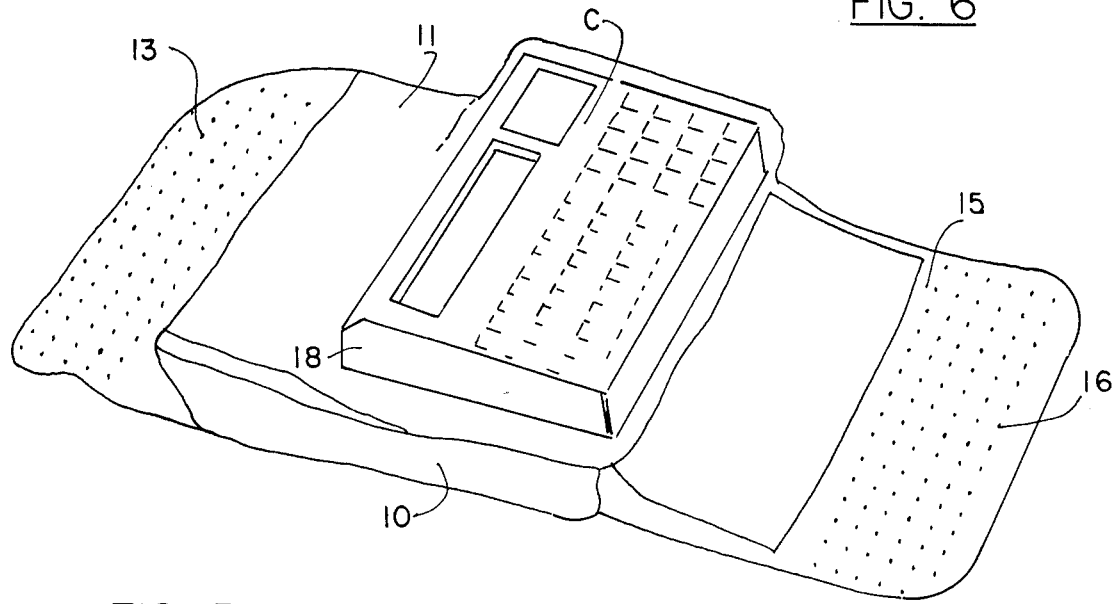
FIG. 6
FIG. 5

ENCLOSURE FOR DEVICES SUCH AS CALCULATORS

BACKGROUND OF THE INVENTION

It is sometimes desirable to mount a pocket calculator on the user's forearm. The prior art teaches two ways of doing this. First, the calculator may be strapped to the forearm as in the case of a wrist watch; however this exposes the calculator to dust and the elements of nature especially when worn by an engineer working at a construction site. Secondly, a calculator may be supported in a casing which is strapped to the forearm; however this prevents use of the calculator without removing it from the casing. With either of the above prior art arrangements, the calculator is in an inconvenient position if and when placed on a horizontal surface such as a desktop.

SUMMARY OF THE INVENTION

One object of this invention is to overcome the drawbacks of the prior art as stated above. The calculator is mounted in a casing having a transparent window above the keys of the calculator. The window is made of plastic vinyl so highly flexible that the user may depress any key of the calculator, or operate any switch or lever of the calculator, without affecting any other key, switch or lever. The casing is mounted on a pad which is longer than the width of the calculator so that the pad can be partly folded onto itself to form a prop which will position the face of the calculator at a 45° angle to the desktop when the calculator is placed on the desktop.

A long strap passes between (a) the casing for said calculator and (b) said pad, and connects the two together. When the calculator is to be mounted on a forearm the strap encircles the forearm to hold the casing on the forearm. When the calculator is to be mounted on a desktop, the strap holds the partly folded pad in a position to act as a prop.

BRIEF DESCRIPTION OF THE DRAWINGS

FIG. 1 is a perspective view of the invention as applied to the arm of the user.

FIG. 2 is a top view of the device for holding a calculator.

FIG. 3 is a side view of the device of FIG. 2.

FIG. 4 is a perspective view of the device with a calculator C partially inserted therein.

FIG. 5 is a perspective view of the device with the calculator C fully inserted.

FIG. 6 is a side view of the device when configured to be mounted on a flat surface such as a desk.

FIG. 7 is a perspective view of the device holding calculator C and resting on a desk.

The arm band comprises a polyurethane foam pad 10a covered by a nylon fabric pad cover 10b and collectively referred to as pad 10. The pad 10 is longer, by the distance 11, than the height of calculator C and its plastic casing 18. The casing 18 has piping 19 and a zipper 20. The zipper 20 permits the vinyl casing 18 to be opened to allow insertion of calculator C as shown in FIG. 4. The casing 18 has a front side comprising window 18a, a back side facing the nylon strap 12, 15 and the pad 10, and an upper side 18b.

A nylon fabric strap S is mounted along the top surface of pad 10 as well as on the back side of casing 18, and has extensions 12 and 15 extending beyond the pad 10. The nylon fabric strap portion 12 has hook Velcro 13 on its to side and loop Velcro 14 on its bottom side. The nylon fabric strap portion 15 has hook Velcro element 16 on its top side and loop Velcro element 17 on its bottom side.

As shown in FIG. 1 the device may be supported on the arm of the user. The calculator C is held in casing 18. The nylon strap extensions 12 and 15 are interconnected by the Velcro elements 14 and 16 or 13 and 17 as the case may be. The upper side of plastic casing 18 has a clear vinyl window that is made of highly flexible material so that the various keys of the calculator may be depressed by a human finger pressing the desired key through the highly flexible window 18a. The flexibility of the vinyl window is so high that the user's finger may easily press any selected key without affecting any other key.

The device may also support the calculator on a flat surface such a desk top with a suitable operating angle to the desk top of 45° as shown in FIGS. 6 and 7. To achieve this the fabric strap portion 11 is partly folded and held in place when the hook Velcro 13 engages the loop Velcro 17. The lengths of the Velcro elements 13 and 16 and the lengths of strap extensions 12 and 15 are selected so that, when Velcro element 13 engages Velcro element 17, the pad portion 11 is held at the proper position to prop the upper end of Calculator C above the desk top by a distance that will slant the front face of the calculator C at a 45° angle to the desk top.

Suitable dimensions may be as follows. The pad 10 and the casing 18 may each be about one inch thick. The clear vinyl window 18a may be about 4 inches by 7½ inches, to hold a Hewlett-Packard Model 71 calculator. The overall length of the device as shown in FIG. 2, including the strap extensions 12 and 15 (including the Velcro end portions 13 and 16), may be about 14½ inches.

The casing 18 may be substantially dust free to protect the calculator C from adverse elements encountered in field conditions. Such protection is assured with a fine mesh zipper 20 which is 14 inches long. The casing 18 may having openings through which any wires, that the calculator C may have, may exit. If desired, the casing 18 may be made watertight.

The pad 10 and the nylon strap extensions 12 and 15 are made of relatively soft material so as not to irritate the skin when the calculator C is held on the forearm as shown in FIG. 1.

I claim to have invented:

1. An enclosure for a device which has numerous closely spaced keys which when depressed operate the device, said enclosure holding and supporting said device and having a plastic transparent window extending over said keys, said window being of material so highly flexible that the user of the device may apply force through the window to depress any single key without the window operating any other key, strap means attached to the enclosure for supporting the enclosure on the forearm of the user with the keys visible to the user through said window, said enclosure having a back side, a first side and a pad positioned between the back side and said forearm, said pad extending away from said first side of said enclosure so that said pad may be partly folded to provide a prop for holding the enclosure at an acute angle to a horizontal surface when the device is positioned on said surface.

2. An enclosure as defined in claim 1 having strap means extending from said pad to hold the enclosure on the user's forearm when it is desired to wear the device and to hold said pad in said partly folded position when it is desired to position the device on a flat surface.

3. An enclosure as defined in claim 2, in which said device is a calculator.

4. An enclosure for a device comprising:
enclosing means, for the device, having a front side composed of a transparent window and a back side, said enclosing means also having a first side,
a pad attached to said back side and extending away from said first side so that the portion of the pad extending away from said first side may be partly folded to form a prop so that the device may be positioned on a horizontal surface with said enclosure at an acute angle to said surface and with said front side facing away from said surface so as to be visible to human eyes positioned at a location higher than said surface, and
means for holding said enclosures on a human forearm with said pad located between said back side and said forearm and with said front side visible to the person on whose forearm the enclosure is mounted,
whereby said pad has the dual function of acting as a pad on the forearm when the enclosure is held on said forearm by said means, and of acting as a prop for the enclosure when the enclosure is mounted on a horizontal surface.

5. An enclosure for a device comprising:
enclosing means for the device having a front side composed of a transparent window and a back side, said enclosing means also having a first side,
a pad attached to said back side and extending away from said first side so that the portion of the pad extending away from said first side may be at least partly folded to form a prop so that the device may be positioned on a horizontal surface with said enclosure at an acute angle to said surface, and
strap means for mounting said enclosing means on the user's forearm, and also for holding said portion of said pad in a position to act as said prop.

6. An enclosure as defined in claim 5 in which said strap means comprises a flexible band that can surround the user's forearm and support said enclosure with said window facing the user's eyes.

7. An enclosure as defined in claim 5 in which said device is a calculator.

8. An enclosure as defined in claim 7 in which said calculator has numerous keys and in which said window is composed of a highly flexible transparent material so that the user can depress any single one of said keys without depressing any other key.

9. An enclosure for a calculator of the type that has numerous keys which are depressed to perform calculations comprising:
enclosing means for said calculator having a front side including a transparent window, over said keys, of a material so highly flexible that the user may depress one key through the window without the window also depressing any other key,
said enclosing means having a rear side, and a first side, and
a pad attached to said rear side and extending away from said first side, and which may be partly folded to a position where it acts as a prop such that when said enclosure means is placed on a horizontal surface that said prop positions said calculator at an acute angle to said surface.

10. An enclosure for a calculator of the type that has numerous keys which are depressed to perform calculations comprising:
enclosure means for said calculator having a front side including a transparent window, over said keys, of a material so highly flexible that the user may depress one key through the window without the window also depressing any other key,
said enclosure means having a rear side, and a first side and
a pad attached to said rear side and extending away from said first side, and which may be partly folded to a position where it acts as a prop such that when said enclosure means is placed on a horizontal surface that said prop positions said calculator at an acute angle to said surface, and
strap means for holding said enclosure on the user's forearm with said window visible to the user and also at the option of the user for holding said pad in said partly folded position.

11. An enclosure as defined in claim 10 in which said strap means comprises a strap a portion of which is between said enclosing means and said pad, said strap extending away from said enclosing means and said pad in two opposite directions so that said strap may encircle the forearm and hold said enclosing means and said pad on the user's forearm;
said strap being connected to both said pad and said enclosing means.

12. An enclosure for holding a calculator, that has numerous closely spaced keys, on a forearm of the user of the device comprising:
enclosure means which has a thickness and also has (a) a first face that comprises a transparent window, (b) a second face that is parallel to and spaced from said first face by the thickness of the enclosing means, and (c) side wall means for connecting the entire peripheries of said first and second faces; so that said two faces with said side wall means form an enclosure that completely surrounds said calculator,
each of said first and second faces having a length and a width, said thickness being small as compared to said length and said width,
said side wall means having an elongated opening and also including closure means for closing said elongated opening, said closure means being in the form of a zipper which may be opened to allow said device to be inserted through said elongated opening and into said enclosure means with said keys visible through said window, said zipper being operable to close said elongated opening after said device has been inserted in said enclosure means,
said transparent window being composed of material so highly flexible that any single one of the keys, of the device inserted in said enclosure means, may be depressed through said window, without the window depressing any other key, and
flexible means connected to said enclosure means for extending around a forearm of the user of the device and holding said enclosure means on the forearm of said user in a position so that the device is readily visible to said user through said window, said flexible means including a pad at least a first portion of which is located between said enclosure and the user's forearm when said enclosure is mounted on the user's forearm, said pad having a second portion thereof which may be at least partly folded to form a prop to position said device at an acute angle to a horizontal surface when said device is positioned on said surface.

13. An enclosure as defined in claim 12 in which said portion of said pad is located beyond the area of said first portion of the pad.

14. An enclosure as defined in claim 13 in which said two portions are at approximately a right angle to each other when one of said portions is used as a prop.

15. An enclosure for a calculator as defined in claim 9, including:

means for holding said enclosure on the forearm of a person and in a position permitting such person to see the calculator through said window and with said pad between the enclosure and the forearm of such person.

* * * * *